United States Patent [19]

Reynolds et al.

[11] 4,428,912

[45] Jan. 31, 1984

[54] REGENERATION OF CHLORIDIZING AGENT FROM CHLORINATION RESIDUE

[75] Inventors: James E. Reynolds, Golden; Alan R. Williams, Denver, both of Colo.

[73] Assignee: Public Service Company of New Mexico, Albuquerque, N. Mex.

[21] Appl. No.: 287,219

[22] Filed: Jul. 27, 1981

Related U.S. Application Data

[63] Continuation-in-part of Ser. No. 50,549, Jun. 20, 1979, Pat. No. 4,288,414, which is a continuation-in-part of Ser. No. 873,400, Jan. 30, 1978, Pat. No. 4,159,310.

[51] Int. Cl.$^3$ .............................................. C01F 7/22
[52] U.S. Cl. .................................... 423/132; 423/135; 423/136; 423/155; 423/202; 423/482
[58] Field of Search ............... 423/135, 136, 149, 482, 423/132

[56] References Cited

U.S. PATENT DOCUMENTS 1,581,436  4/1926  Galt ...................................... 423/482
2,040,867  5/1936  Mitchell et al. ...................... 423/482
3,864,458  2/1975  Roberts ................................ 423/482
4,120,737  10/1978  Berrie et al. ........................ 423/482
4,237,102  12/1980  Cohen et al. ......................... 423/126
4,239,735  12/1980  Eisele et al. ......................... 423/126

FOREIGN PATENT DOCUMENTS 9198 of 1891  United Kingdom ............... 423/482

Primary Examiner—Herbert T. Carter

[57] ABSTRACT

Alkali and alkaline earth metal chlorides contained in a residue of a chlorination process of a feed material of bauxite or clay associated with coal are removed by the addition of sulfuric acid which causes their conversion to their sulfate form, and the simultaneous production of hydrochloric acid. The residue, which has been rendered environmentally acceptable, can be disposed of readily, for example, to an ash pond or disposal area for flue gas desulfurization sludges. The hydrochloric acid is then recycled to the chlorination process. The hydrochloric acid may be utilized, for example, as a binder of the feed material, to prechloridize the feed material or as a portion of the leach solution when the chlorination process is a hydrochloric acid leach.

11 Claims, No Drawings

REGENERATION OF CHLORIDIZING AGENT FROM CHLORINATION RESIDUE

DESCRIPTION

CROSS RELATED PATENT APPLICATIONS

This application is a continuation-in-part application of Ser. No. 050,549, filed June 20, 1979 now U.S. Pat. No. 4,288,414 which is a continuation-in-part application of Ser. No. 873,400, filed Jan. 30, 1978 which is now U.S. Pat. No. 4,159,310.

TECHNICAL FIELD

The process of the invention relates to a method for the disposal of alkali and alkaline earth metal chlorides which remain in the final residue resulting from the chlorination of feed materials containing aluminum, particularly the chlorination of bauxite and clays associated with coal.

BACKGROUND ART

Many processes have been taught for the chlorination of aluminum bearing ores and clays and examples of such processes can be found in U.S. Pat. Nos. 1,605,098; 1,600,216; 1,875,105; 1,866,731; and 3,244,509. Many of these processes do not address the removal of alkali or alkaline earth metals from any residue which may be produced by the process. U.S. Pat. Nos. 3,244,509 and 3,466,169 both utilize electrolysis to remove alkali chlorides and alkaline earth chlorides from the residues produced in their processes.

PRIOR ART STATEMENT

U.S. Pat. No. 4,237,102 discloses an intricate cyclic process for obtaining very pure alumina by a hydrochloric acid attack of a silico-aluminous material. After the aluminum containing feed material has been leached with hydrochloric acid and the aluminum chloride separated, then the oxide impurities contained in the liquor are extracted by the addition of sulfuric acid, in the presence of hydrochloric acid, to form a sulfohydrochloric leach which precipitates the impurities as their sulfates. That leach is then degassed to obtain hydrochloric acid and sulfuric acid which are recycled to the process.

U.S. Pat. No. 4,239,735 discloses the removal of metal oxide impurities from kaolin clay by the use of a dilute mineral acid, e.g., 2 N-6 N hydrochloric, nitric acid or sulfuric acid, as a preleach of kaolin clay prior to subjecting the clay to a 26 percent hydrochloric acid and $H_2SiF_6$ leach to recover aluminum chloride.

None of the prior art recognizes or suggests the utilization of sulfuric acid as a means for removing alkali and alkaline earth metal chlorides from the residue produced by a chlorination process of bauxite or a clay associated with coal and to produce a dilute hydrochloric acid for use in a pretreatment of the feed material or in the chlorination process.

DISCLOSURE OF THE INVENTION

Alkali and alkaline earth metal chlorides contained in a residue of a chlorination process of a feed material containing aluminum are rendered environmentally inert by the addition of sulfuric acid which causes the conversion of the metals to their sulfate form and the simultaneous production of hydrochloric acid. The residue can be disposed of readily, for example, to an ash pond or disposal area for flue gas desulfurization (FGD) sludges. The hydrochloric acid which is produced can be used in the chlorination process. For example, it can be utilized as a binder of the feed material and/or to prechloridize the feed material, e.g., convert a portion of the chlorine consuming constituents to their respective chlorides, or it may be utilized as a portion of the leach solution if the chlorination process utilized is a hydrochloric acid leach.

PREFERRED MODES FOR CARRYING OUT THE INVENTION

The process of the present invention is applicable to any chlorination processes of feed materials which produce a residue containing alkali or alkaline earth chlorides. It is especially useful in those chlorination processes for the recovery of aluminum from the feed material and is particularly beneficial in the chlorination of bauxite and clays associated with coals wherein the residue produced therefrom contains alkali or alkaline earth metals.

Clays are generally fine-grained earthy material made up of minerals which are essentially hydrous aluminum silicates. The specific mineral content of the clay depends upon the area in which the clay is found. The clays on which the present process is operable are ones found associated with coal, for example, parting clays which are found between seams of coal. Additional examples include top and bottom contact clays, which are found at the top and bottom, respectively, of the coal reserve, clays in the overburden of the coal and clays found in coal refuse, i.e., the washings of coal to remove ash forming minerals from the coal.

The particular chlorination process of the bauxite or clay associated with coal is not critical to the process of the present invention as long as the residue from the process contains alkali or alkaline earth metal chlorides. For example, the chlorination process can be two stages with both chlorination steps being conducted in the presence of a reducing agent and chlorine, for example, that disclosed in U.S. Pat. Nos. 1,605,098 and 1,600,216. The clays can be chlorinated in the presence of carbon monoxide and chlorine at a temperature of 600°–900° C. to chlorinate the aluminum, iron and titanium. Thereafter, the residue can be treated with carbon, and chlorine at an elevated temperature to chlorinate the silica and aluminum silicates contained in the clay, for example, the process disclosed in U.S. Pat. No. 1,875,105. The chlorination process can be comprised of treating the feed material containing aluminum and silicic acid with a carbonaceous material and equal parts of chlorine and silicon tetrachloride in order to chlorinate the aluminum and not the silica contained in the material, for example, as described in U.S. Pat. No. 1,866,731. The chlorination process can utilize a reductive chlorination followed by an oxidative chlorination. Alternatively, the chlorination process can be a leaching process, for example, leaching with hydrochloric acid.

Essentially, the process of the present invention is useful in all chlorination processes of bauxite and clay associated with coal which contain aluminum wherein the chlorination process produces a residue containing alkali or alkaline earth metal chlorides. The process is particularly beneficial when the residue contains calcium chloride. The residue is treated with sulfuric acid in an amount which is sufficient to convert the chloride values to their sulfate forms. It is generally preferred that the sulfuric acid be supplied in an amount which is slightly in excess of the stoichiometric amount required for the reaction of the alkali or alkaline earth metals sought to be converted. Generally, the sulfuric acid will be utilized in an amount of from about 250 percent to about 350 percent and preferably from about 275 percent to about 325 percent based on the weight of contained calcium in the residue being treated. To improve gypsum precipitation conditions and extract the chlorides of alkali metals with high yield, preferably a diluted sulfuric acid, containing approximately 50 weight percent or less sulfuric acid, is utilized. For example, the sulfuric acid can be obtained from a sulfur dioxide scrub-regeneration system utilized on stack gas. The sulfuric acid will cause the precipitation of calcium, if present, as gypsum and will leach out water-soluble chlorides and a small amount of acid soluble chlorides.

Generally, the sulfuric acid leach is conducted for a time of from about 10 minutes to about 1 hour and preferably from about 15 minutes to about 30 minutes. Shorter leach times may result in incomplete solubilization of metal chlorides, while longer leach times unnecessarily increase the cost of leach equipment and energy to suspend the leach pulp. Generally, a temperature of from about 30° C. to about 70° C. and preferably from about 40° C. to about 60° C. produces a rapid filtering residue.

After the leaching, the residue is subjected to a solid-liquid separation and liquor recovered therefrom, which contains dilute hydrochloric acid, sulfuric acid and some small amounts of metal chlorides, is recycled back to the chlorination process preferably for use as a binder for pelletizing the feed material and/or to prechloridize the feed material. The hydrochloric acid is a preferred binder for the feed material as it apparently chemically reacts with the feed material to form hydrates which aid in the binding process. The use of the hydrochloric acid as a binder will also prechloridize the feed material since it will convert at least a portion of the chlorine consuming alkali and alkaline earth metals contained in the feed material to their respective chloride salts. The prechlorination of the feed material is particularly beneficial when it contains high levels of calcium or magnesium.

If the chlorination process utilizes a hydrochloric acid leach, then the hydrochloric acid liquor may form a part of the leach or may be used as a preleach to prechloridize at least a portion of the chlorine consuming alkali and alkaline earth metals contained in the feed material.

The process of the present invention is particularly useful in an oxidative, reductive chlorination such as that disclosed in U.S. Ser. No. 050,549, filed June 20, 1979 and incorporated herein by reference. In such a process, generally the clay or bauxite is first pelletized with a hydrochloric acid binder solution. The pellets are high-density, high strength pellets. Following pelletizing, the pellets are dried, for example, at about 300° C. in a direct fire dryer. Dry pellets are inventoried for feed to the shaft chlorinator furnace. The clay or bauxite may be ground before pelletizing; however, this does not affect the recovery of the metal values.

Shaft chlorinations require a high-crush, strong pellet feed which does not lose strength during chlorination. Pelletization of clay or bauxite without any binder produces a weak pellet when sintered at 300° C. Various binders can be utilized, for example, sulfuric acid, hydrochloric acid, sodium chloride and bentonite. When bentonite is utilized the sintering should be done at a temperature of about 1,000° C. Hydrochloric acid is the preferred binder, particularly hydrochloric acid produced in accordance with the process of the present invention.

The feed material whether or not pelletized, is then subjected to an oxidative chlorination step wherein the iron is first removed by selective chlorination. In this step, about 90 percent of the iron is converted and volatilized as ferric chloride with substantially no chlorination or volatilization of the other metal values present. The oxidative chlorination is conducted in the presence of chlorine and oxygen gases which are circulated for up to three hours through the charge of feed material to oxidatively chlorinate and volatilize about 90-95 percent of the iron content. The oxygen is employed in an amount of from about 20 percent to about 60 percent and preferably from about 30 percent to about 50 percent by volume of the total gas composition. The chlorine is employed in an amount which is a small stoichiometric excess of that needed to chlorinate the iron. The oxidative chlorination is conducted at a temperature of from about 650° to about 900° C. and preferably from about 750° to about 800° C. for a time period sufficient to allow for the chlorination of most of the iron present. Generally, the time period is from about 0.5 to about 2 hours.

Therefter, the material is subjected to a reductive chlorination. The degree of chlorination of silica in the reductive chlorination step is greatly reduced by using only carbon monoxide as a reducing agent rather than a carbonaceous material such as fuel oil or coke. Eliminating solid carbonaceous materials as a reductant has other advantages, such as, permitting initial oxidative chlorination of the pellet charge, increasing the strength of the pellets charged to the chlorinator as there is no loss in pellet strength during the chlorination as there is when coke, pitch or other carbonaceous material is added. Ordinarily, an oxidative chlorination followed by reductive chlorination would necessitate an intermediate addition of coke to the feed, which would be an expensive process step. Surprisingly, this was found not to be necessary in this process.

The carbon monoxide gas is added to the chlorinator in an amount of from about 30 to about 70 percent and preferably from about 40 to about 60 percent by volume of the total gas composition. The chlorine is supplied in slight excess of the stoichiometric amount needed to chlorinate the aluminum present. Chlorine utilization is related to the rate of gas flow, or space velocity, with respect to bed volume of the reactor. The reaction rate appears to be proportional to bed temperature with a lesser dependence on chlorine-carbon monoxide ratio in the reaction gas.

The injection of silicon tetrachloride into the reaction gas mixture of chlorine and carbon monoxide is effective in reducing the amount of chlorination of siliceous material contained in bauxite, refuse, coal and clays associated with coal. From about 3 to about 30 percent silicon tetrachloride by volume of the total gas composition may be injected during the reduction. For example, six percent of silicon tetrachloride combined with carbon monoxide, almost completely rejects silica chlorination with only a small loss in alumina recovery. A preferred method for introducing the silicon chloride is to run the chlorine through the liquid silicon chloride before it enters the reactor. The reaction of carbon monoxide is sufficiently exothermic to be self-heating. Generally, the temperature of the reductive chlorination step is from about 600 to about 850° C. and preferably from about 650° to about 750° C. The reductive chlorinator is operated for a time period of from about 1 to about 3 hours to collect a small amount of residual iron chloride in a first stage condensor and a high purity aluminum chloride in a second stage condensor. A third-stage condensor collects the chlorides of titanium and silicon. The use of fractional distillation to recover volatilized chlorides and noncondensables, e.g., chlorine, carbon monoxide and carbon dioxide, of the process is described in Ser. No. 050,549, filed June 20, 1979.

The cooled, depleted pellets are conveyed to the leach circuit where water soluble chlorides, if present, are removed and calcium chloride is precipitated as gypsum with sulfuric acid. The residue solids are filtered, washed and sent to the disposal, while the hydrochloric acid solution is evaporated as required for water balance control and recycled to the pelletization step for reuse as a pellet binder and/or for reuse as a pre-chloridizer.

What is claimed is:

1. In a process for the chlorination of a feed material selected from the group consisting of clay associated with coal and bauxite comprising leaching said feed material with a chlorinating agent to chlorinate said aluminum and to produce a residue containing a chloride selected from the group consisting of alkali and alkaline earth metal chloride, the improvement comprising adding sulfuric acid to the residue under conditions to cause the conversion of at least a portion of the alkali or alkaline earth metal chlorides to their environmentally inert sulfate forms and to form a dilute hydrochloric acid and further comprising at least one step of (a) using said dilute hydrochloric acid as a pre-chloridizing agent prior to said chlorination of (b) using said dilute hydrochloric acid as a binder for pelletizing said feed material prior to said chlorination.

2. In a process for the chlorination of the metals contained in an aluminous feed material including at least one metal selected from the group consisting of alkali and alkaline earths, said aluminous feed selected from the group consisting of bauxite and clay associated with coal wherein the chlorination process produces a residue containing a chloride selected from the group consisting of alkali and alkaline earth metal chlorides, the improvement comprising leaching said residue with sulfuric acid in an amount at least stoichiometrically equal to the amount of alkali and alkaline earth metals present for at least about ten minutes at a temperature of from about 30° C. to about 70° C. to produce a second residue containing environmentally inert sulfate forms of said alkali and alkaline earths and to form a leach liquor comprising dilute hydrochloric acid for use in the chlorination process and further comprising at least one step of (a) using said dilute hydrochloric acid to pre-chloridize at least a portion of the chlorine-consuming constituents contained in the feed material prior to the chlorination process or (b) using said dilute hydrochloric acid as a binder to form the feed materials into pellets suitable for use in the chlorination process.

3. The process of claim 1 or 2 wherein said residue contains calcium chloride and wherein upon the addition of sulfuric acid a gypsum-containing second residue is precipitated from a liquor comprising dilute hydrochloric acid.

4. In a process for recovering aluminum from an aluminum-iron-containing clay associated with coal wherein the clay also contains at least one metal selected from the group consisting of alkali and alkaline earths and is subjected to a selective chlorination process for the recovery of said iron and aluminum as chlorides thereof and wherein a residue containing a chloride selected from the group consisting of alkali and alkaline earth metals is formed, the improvement comprising leaching said residue with sulfuric acid to convert at least a portion of the alkali and alkaline earth metal chlorides to their environmentally inert sulfates and to form dilute hydrochloric acid and thereafter recycling said dilute hydrochloric acid to the selective chlorination process for use as a binder for pelletizing said feed material prior to said chlorination.

5. The process of claim 2 or claim 4 wherein the sulfuric acid is utilized in an amount which is in excess of the stoichiometric amount required for reaction of the sulfuric acid with the alkali and alkaline earth metal chlorides.

6. The process of claim 5 wherein the sulfuric acid is utilized in an amount of from about 250 to about 350 weight percent based on the weight of alkaline earth metal chlorides.

7. The process of claim 6 wherein the chlorination process is comprised of an oxidative chlorination of the feed material followed by a reductive chlorination.

8. A method of treating an alkali metalore alkaline earth metal-containing residue of a chlorination process for an aluminum-containing feed material selected from the group consisting of clay associated with coal and bauxite comprising:
   (a) leaching said residue with an amount of sulfuric acid at least stoichiometrically equal to the amount of alkali and alkaline earth metals present in said feed for a time period of at least ten minutes to form a second residue containing environmentally inert sulfates of said alkali and alkaline earth metals and a leach liquor comprising dilute hydrochloric acid;
   (b) recycling said dilute hydrochloric acid to said chlorination process as a pre-chlorination agent prior to said chlorination; and
   (c) utilizing said dilute hydrochloric acid for use as a binder for pelletizing said feed material prior to said chlorination.

9. A method according to claim 8 wherein said chlorination process utilizes a hydrochloric acid leach and wherein said dilute hydrochloric acid may form a part of said leach.

10. A method according to claim 8 wherein said chlorination is an oxidative, reductive chlorination.

11. A method according to claim 10 wherein said pelletized feed undergoes oxidative chlorination at from about 650° C. to about 900° C. and is thereafter subjected to a reductive chlorination in the presence of carbon monoxide at a temperature of from about 600° C. to about 800° C. to produce depleted pellets containing water soluble chlorides which form the residue of step (a).

* * * * *